(12) United States Patent
Tang

(10) Patent No.: US 11,948,391 B2
(45) Date of Patent: Apr. 2, 2024

(54) MODEL TRAINING METHOD AND APPARATUS, ELECTRONIC DEVICE AND READABLE STORAGE MEDIUM

(71) Applicant: BOE Technology Group Co., Ltd., Beijing (CN)

(72) Inventor: Xiaojun Tang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 400 days.

(21) Appl. No.: 17/355,893

(22) Filed: Jun. 23, 2021

(65) Prior Publication Data

US 2022/0164571 A1 May 26, 2022

(30) Foreign Application Priority Data

Nov. 25, 2020 (CN) .......................... 202011337229.6

(51) Int. Cl.
*G06N 3/04* (2023.01)
*G06F 7/78* (2006.01)
*G06F 17/16* (2006.01)
*G06N 3/08* (2023.01)
*G06V 40/10* (2022.01)

(52) U.S. Cl.
CPC .............. *G06V 40/103* (2022.01); *G06F 7/78* (2013.01); *G06F 17/16* (2013.01); *G06N 3/08* (2013.01)

(58) Field of Classification Search
CPC .......... G06N 3/045; G06N 3/08; G06N 3/084; G06N 3/04; G06N 3/048; G06V 40/103; G06V 10/50; G06V 10/513; G06V 10/56; G06V 40/20; G06V 10/40; G06V 10/462; G06V 20/47; G06V 20/52; G06V 20/53; G06V 40/10; G06T 2207/10016; G06T 2207/20081; G06T 2207/20084; G06T 2207/30196; G06T 7/246; G06T 7/277
See application file for complete search history.

(56) References Cited

FOREIGN PATENT DOCUMENTS

| CN | 108875487 | A | | 11/2018 | | |
|---|---|---|---|---|---|---|
| CN | 109919235 | A | * | 6/2019 | | |
| CN | 111666800 | A | * | 9/2020 | ......... | G06K 9/00369 |
| CN | 111666800 | A | | 9/2020 | | |
| WO | WO-2020045539 | A1 | * | 3/2020 | ......... | G06K 9/00986 |

* cited by examiner

*Primary Examiner* — Quan M Hua
(74) *Attorney, Agent, or Firm* — IPro, PLLC

(57) ABSTRACT

The present application provides a model training method and apparatus, an electronic device and a readable storage medium. The model training method of a pedestrian re-identification network, includes: determining a current weight matrix for multiple identification objects according to a current training result of a neural network model; calculating a difficulty vector corresponding to the multiple identification objects according to the current weight matrix; and, selecting next training samples of the multiple identification objects for a next training according to the difficulty vector.

17 Claims, 6 Drawing Sheets

--- determining a current weight matrix for multiple identification objects according to a current training result of a neural network model — S12 calculating difficulty vector corresponding to the multiple identification objects according to the current weight matrix — S14 selecting next training samples of the multiple identification objects for a next training according to the difficulty vector — S16

MODEL TRAINING METHOD AND APPARATUS, ELECTRONIC DEVICE AND READABLE STORAGE MEDIUM

CROSS-REFERENCE TO RELATED APPLICATION

The present application claims a priority of the Chinese patent application No. 202011337229.6 filed on Nov. 25, 2020, which is incorporated herein in its entirety.

TECHNICAL FIELD

The present application relates to the field of pedestrian re-identification technologies, and in particular to a model training method and apparatus of a pedestrian re-identification network, an electronic device, and a readable storage medium.

BACKGROUND

Pedestrian re-identification refers to identification of a pedestrian image captured by a camera to identify an ID of a pedestrian or identify whether two pedestrian images belong to the same pedestrian. The pedestrian re-identification can realize pedestrian search across cameras, and has a wide range of applications in video surveillance. Pedestrian re-identification algorithms in the current neural network model has a low accuracy.

SUMMARY

According to an aspect of the present application, a model training method of a pedestrian re-identification network is provided and includes: determining a current weight matrix for multiple identification objects according to a current training result of a neural network model; calculating a difficulty vector corresponding to the multiple identification objects according to the current weight matrix; and, selecting next training samples of the multiple identification objects for a next training according to the difficulty vector.

Optionally, the calculating the difficulty vector corresponding to the multiple identification objects according to the current weight matrix, includes: calculating a cosine distance matrix according to the current weight matrix and a transposed matrix of the current weight matrix; wherein the cosine distance matrix is calculated by the following conditional formula:

$D = W * W^T$, wherein D is the cosine distance matrix, $W^T$ is the transposed matrix of the current weight matrix, and W is the current weight matrix.

Optionally, the calculating the difficulty vector corresponding to the multiple identification objects according to the current weight matrix, includes: based on the cosine distance matrix, calculating the difficulty vector corresponding to the multiple identification objects according to the following conditional formula:

$C_i = \max\limits_{n \neq i} D(i, n)$; and $C = \{C_1, C_2, C_3, \ldots, C_N\}$ wherein, "i" indicates that a row number in the cosine distance matrix D is an i-th row, "n" indicates that a column number in the cosine distance matrix D is an n-th row or an n-th column; "C" represents the difficulty vector corresponding to the multiple identification objects; C_i represents a difficulty of distinguishing the identification objects, N represents the number of identification objects.

Optionally, the selecting next training samples of the multiple identification objects for a next training according to the difficulty vector, includes: determining a target identification object with a greatest difficulty in the difficulty vector corresponding to the multiple identification objects; and, selecting a first number of samples of the target identification object from a training data set and randomly selecting a second number of samples of multiple identification objects to form the next training sample.

Optionally, the selecting next training samples of the multiple identification objects for a next training according to the difficulty vector, includes: determining an identification difficulty probability of each identification object according to the difficulty vector corresponding to the multiple identification objects; and, selecting a predetermined number of next training samples from a training data set according to the identification difficulty probability.

Optionally, the determining the current weight matrix for multiple identification objects according to the current training result of the neural network model, includes: obtaining a feature vector of current training samples by performing feature extraction on the current training samples through the neural network model; obtaining confidence level corresponding to the multiple identification objects by processing the feature vector according to neural network fully connected operation; and, enabling each row vector in a weight matrix of the fully connected operation to be corresponding to a feature vector of each identification object, and normalizing each row vector of the weight matrix so that 2-norm of each row vector of the weight matrix is 1.

Optionally, the normalizing each row vector of the weight matrix so that 2-norm of each row vector of the weight matrix is 1, includes: normalizing each row vector of the weight matrix according to the following conditional formula:

$$\begin{cases} S(i) = \sqrt{\sum_j W_0(i,j)^2} \\ W(i,j) = W_0(i,j)/S(i) \end{cases}$$

wherein $W_0(i,j)$ represents an element in an i-th row and a j-th column of the weight matrix before normalization; S(i) represents mean square value of the weight matrix before normalization; W(i,j) represents an element in an i-th row and a j-th column of the weight matrix after normalization.

According to another aspect of the present application, a model training apparatus is provided and includes: a determination module, a calculation module and a selection module. The determination module is configured to determine a current weight matrix for multiple identification objects according to a current training result of a neural network model. The calculation module is configured to calculate a difficulty vector corresponding to the multiple identification objects according to the current weight matrix. The selection module is configured to, select next training samples of the multiple identification objects for a next training according to the difficulty vector.

According to another aspect of the present application, an electronic device is provided and include: a processor and a memory; wherein the memory stores a computer program, and the computer program is executed by the processor to implement the model training method in any of the foregoing embodiments.

According to another aspect of the present application, a non-volatile computer-readable storage medium is provided and includes a computer program stored thereon; wherein the computer program is executed by one or more processors to implement the model training method in any of the foregoing embodiments.

The model training method and apparatus, the electronic device and the readable storage medium of the present application normalize the weight matrix in the pedestrian re-identification training network, calculate the difficulty vector of the training samples to increase a probability of loading difficult samples in the sample loading process, thereby improving the algorithm's ability to distinguish difficult samples and improving the accuracy of the algorithm.

It is to be understood that the contents in this section are not intended to identify the key or critical features of the embodiments of the present application, and are not intended to limit the scope of the present application. Other features of the present application will become readily apparent from the following description.

BRIEF DESCRIPTION OF THE DRAWINGS

The drawings are included to provide a better understanding of the application and are not to be construed as limiting the application. Wherein.

DETAILED DESCRIPTION

Reference will now be made in detail to the exemplary embodiments of the present application, examples of which are illustrated in the accompanying drawings, wherein the various details of the embodiments of the present application are included to facilitate understanding and are to be considered as exemplary only. Accordingly, a pedestrian skilled in the art should appreciate that various changes and modifications can be made to the embodiments described herein without departing from the scope and spirit of the present application. Also, descriptions of well-known functions and structures are omitted from the following description for clarity and conciseness.

Figure 1:
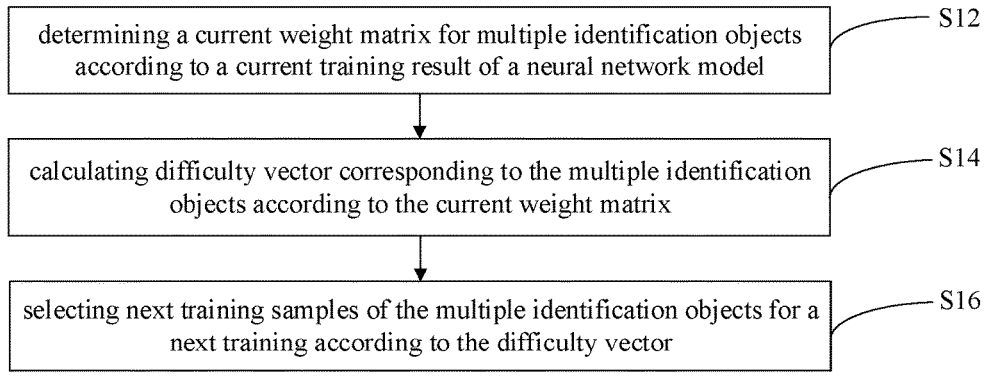
FIG. 1 is a schematic flowchart of a model training method according to some embodiments of the present application.

Referring to FIG. 1, one embodiment of the present application provides a model training method, including:

S12: determining a current weight matrix for multiple identification objects according to a current training result of a neural network model;

S14: calculating a difficulty vector corresponding to the multiple identification objects according to the current weight matrix;

S16: selecting next training samples of the multiple identification objects for a next training according to the difficulty vector.

Figure 2:
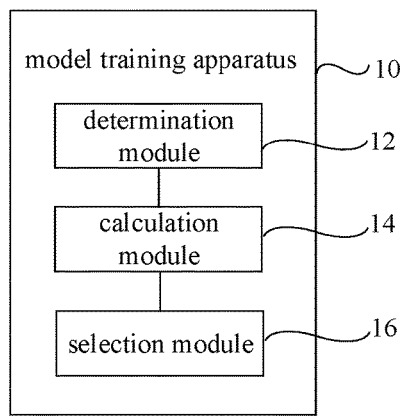
FIG. 2 is a schematic diagram of a model training apparatus according to some embodiments of the present application.

Referring to FIG. 2, one embodiment of the present application provides a model training apparatus 10. The model training apparatus 10 includes a determination module 12, a calculation module 14 and a selection module 16.

The step S12 may be implemented by the determination module 12. The step S14 may be implemented by the calculation module 14. The step S16 may be implemented by the selection module 16. That is, the determination module 12 is configured to determine a current weight matrix for multiple identification objects according to a current training result of a neural network model. The calculation module 14 is configured to calculate difficulty vector corresponding to the multiple identification objects according to the current weight matrix. The selection module 16 is configured to, select next training samples of the multiple identification objects for a next training according to the difficulty vector.

Figure 3:
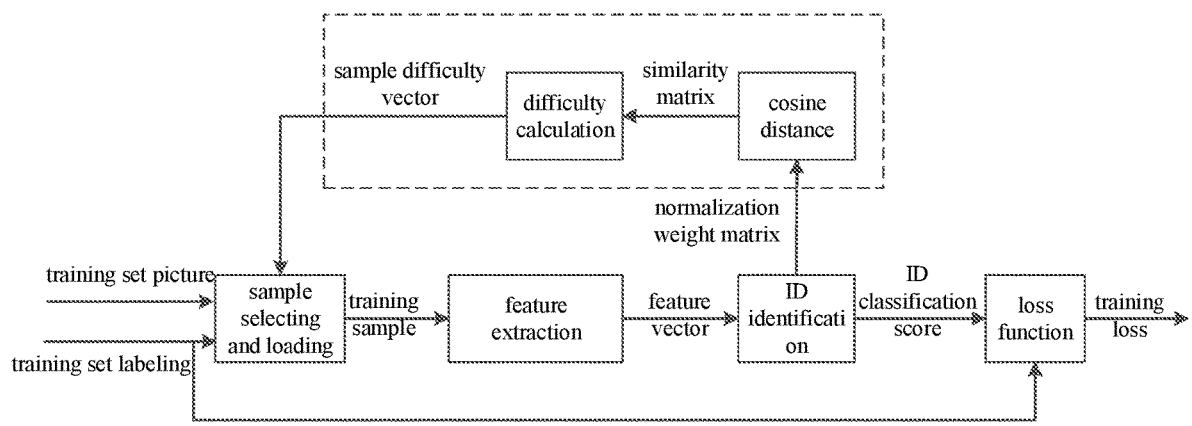
FIG. 3 is a schematic diagram of a training network model according to some embodiments of the present application.

Specifically, the neural network model is a pedestrian re-identification training network model. As shown in FIG. 3, the pedestrian re-identification training network model includes: sample loading, feature extraction, ID identification, and loss function, calculation module. The pedestrian re-identification training network model is based on convolutional neural networks (CNN).

It can be understood that the convolutional neural networks have powerful image representation ability and are widely used in computer vision algorithms such as image identification, target detection, and image segmentation. Similarly, most of high-accuracy pedestrian re-identification algorithms also employ the convolutional neural networks.

Figure 4:
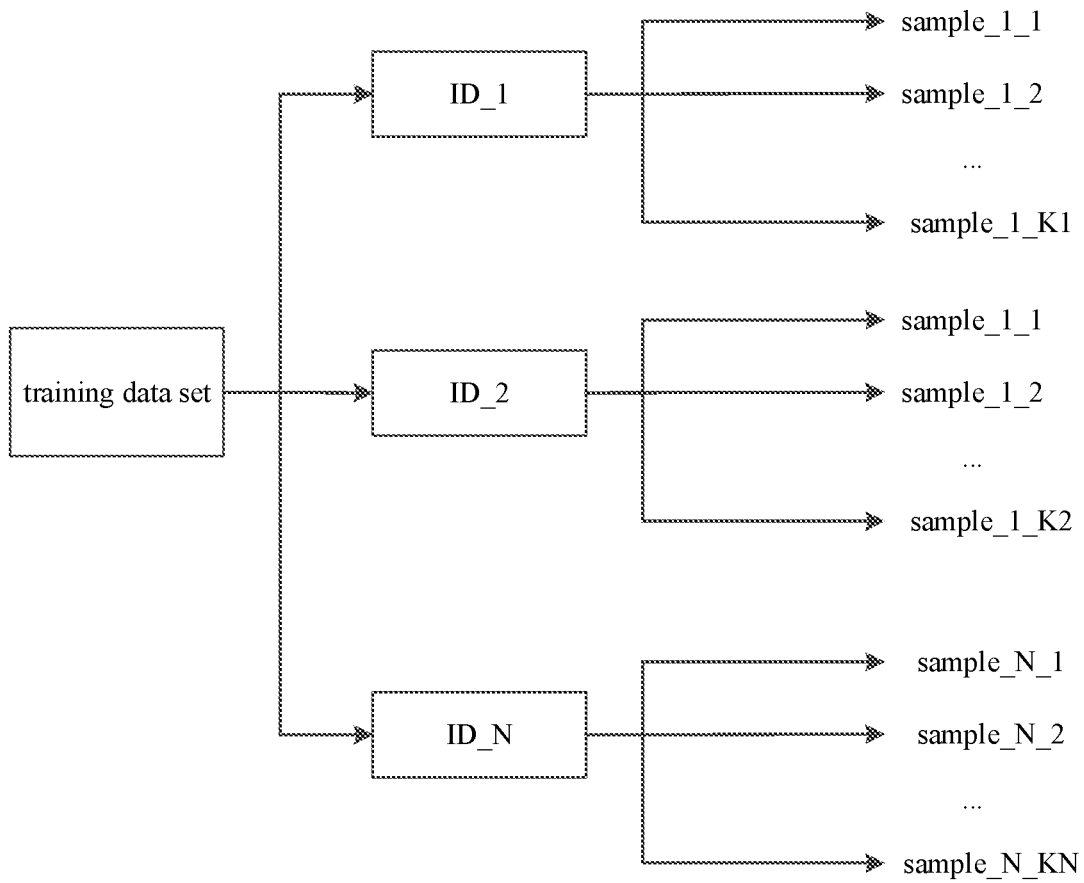
FIG. 4 is a schematic diagram of a training data set according to some embodiments of the present application.

The current training result is obtained by taking a pedestrian re-identification data set as a training data set (as shown in FIG. 4) and training the neural network model with the training data set. That is, for all training data sets, in a traditional neural network model training method, an ID identification process can extract features of different pedestrians (ID), an identification confidence level is obtained by neural network fully connected operation, and a weight matrix of the fully connected operation can be normalized to obtain the current weight matrix of the model training method of the present application. Referring to FIG. 4, the training data set includes sample data of multiple different pedestrians. For convenience of description, a total number of pedestrians is recorded as N, and different pedestrians are distinguished with different digital IDs. A value of ID ranges from 1 to N. Each pedestrian has several samples. The numbers of samples of pedestrians with different IDs may be different. For example, Zhang San's ID is 1, and collected training samples include 20 pictures; Li Si's ID is 2, and collected training samples include 30 pictures. In the training data set, the numbers of sample pictures of pedestrians with different IDs may not be the same. The number of samples of a pedestrian with an ID "i" is recorded as Ki. Each sample data includes a pedestrian picture and a corresponding ID label. The ID label refers to a real ID labeled to a real picture corresponding to a pedestrian, which is equivalent to labeling a standard answer of pedestrian sample training data, i.e., a real ID corresponding to the pedestrian (or an identification object).

It should be noted that a weight matrix of a next sample training is the current weight matrix obtained last time.

Sample loading means that in each round of training process of the neural network model, a certain number of training samples needs to first be loaded from the training data set. The usual practice includes scrambling the training data set first, and then sequentially reading M training samples. The sequential reading refers to arranging several training samples into a queue and then sequentially reading samples from beginning to end.

Feature extraction refers to using a CNN network to extract features. Commonly used networks include ResNet, MobileNet, ShuffleNet, etc. In other words, the neural network model may be constructed based on ResNet, MobileNet, or ShuffleNet. The feature extraction can obtain feature vector of training samples.

ID identification uses a fully connected operation to process feature vector to obtain an ID classification confidence level, that is, a classification core that each image is identified as for each ID. The higher the score corresponding to a certain ID, the greater the probability that the sample belongs to the certain ID. Specifically, the ID identification refers to using a deep learning fully connected network to obtain scores that each image is identified as for different IDs, and generally, taking an ID with a highest identification score as an identification ID.

The loss function is to calculate a loss value by calculating a difference between the identification ID and the real ID. In a case that the identification ID and the real ID are the same, a calculated loss value is small. On the contrary, the identification ID and the real ID are different, then the loss value is large. The training process of the deep learning is to achieve model training by minimizing the loss value. That is, specific content of the loss function is to calculate a training loss function by comparing ID classification and ID label, and realize model training by minimizing training loss-optimizing model parameters. Commonly used classification loss functions include Softmax, SphereFace, CosFace, ArcFace, etc.

The current weight matrix may be a matrix W, where columns in the matrix W may refer to different pedestrians, and rows in the matrix W may refer to feature vector of different pedestrians. For example, the matrix W may be a 3*2 matrix as follows $$\begin{bmatrix} 1 & 0 \\ 0 & 1 \\ 0.2 & 0.98 \end{bmatrix},$$

where a first row may represent feature vector of a first pedestrian with an ID1, a second row may represent feature vector of a second pedestrian with an ID2, and a third row may represent feature vector of a third pedestrian with an ID3.

The selecting next training samples of the multiple identification objects for a next training according to the difficulty vector, can be understood as that samples for each training are changed, and the current weight matrix changes with changes of each training result of the training sample, but the number of samples for each training does not change. For example, a preset number of training samples may be 10, 15, 20, 25, 30, 35, 40, 45, 50 images, etc. The number of times of training may be 10, 20, 40, 50, 100, 300, 500, 600, 900, 10000 times, etc. The more times of training, the higher the accuracy of the algorithm.

The model training method of the present application normalizes the current weight matrix in the pedestrian re-identification training network, and calculates the difficulty vector of the training samples to increase a probability of loading difficult samples in the sample loading process, thereby improving the algorithm's ability to distinguish difficult samples and improving the accuracy of the algorithm.

Figure 5:
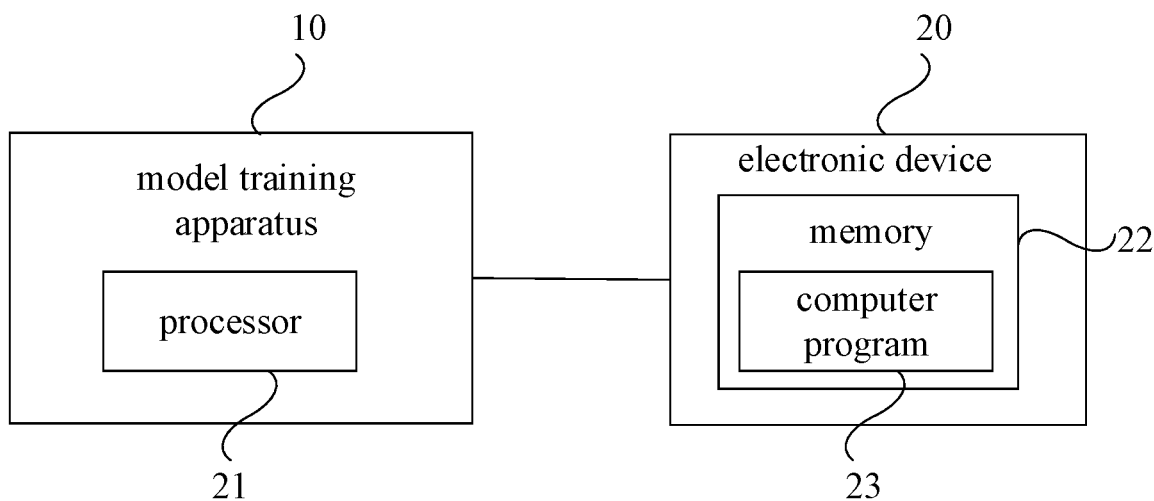
FIG. 5 is a schematic diagram of an electronic device according to some embodiments of the present application.

Referring to FIG. 5, one embodiment of the present application further provides an electronic device 20. The electronic device 20 includes a processor 21 and a memory 22. The memory 22 stores a computer program 23. The computer program is executed by the processor 21 to perform: determining a current weight matrix for multiple identification objects according to a current training result of a neural network model; calculating difficulty vector corresponding to the multiple identification objects according to the current weight matrix; and selecting next training samples of the multiple identification objects for a next training according to the difficulty vector. The electronic device 20 may be a device with a pedestrian image, such as a surveillance camera, a mobile phone, a tablet computer or other smart devices, which are not listed here.

Figure 6:
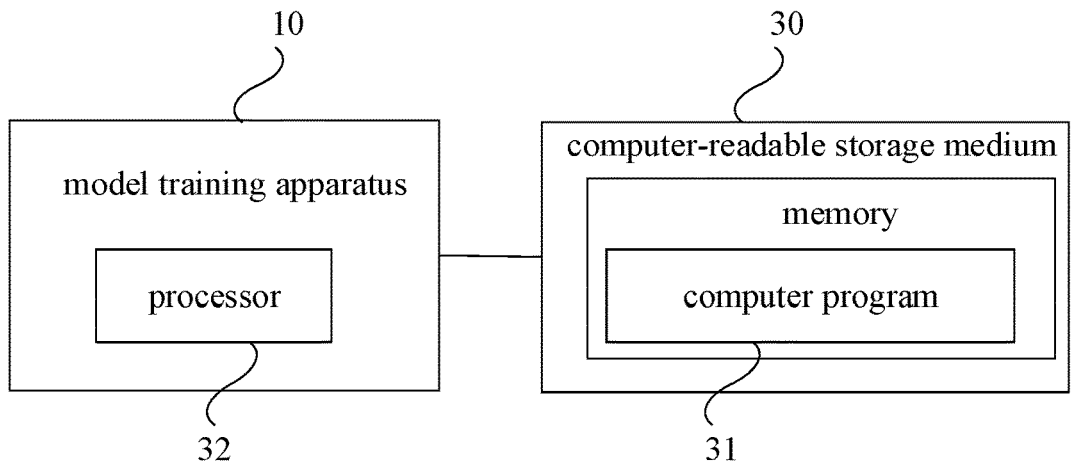
FIG. 6 is a schematic diagram of a computer-readable storage medium according to some embodiments of the present application.

Referring to FIG. 6, one embodiment of the present application further provides a non-volatile computer-readable storage medium 30. The non-volatile computer-readable storage medium 30 stores a computer program 31.

When the computer program 31 is executed by one or more processors 32, the steps of the model training method of any one of the foregoing embodiments are implemented.

For example, when the program is executed by the processor 32, the following steps of the model training method are implemented:

S12: determining a current weight matrix for multiple identification objects according to a current training result of a neural network model;

S14: calculating difficulty vector corresponding to the multiple identification objects according to the current weight matrix;

S16: selecting next training samples of the multiple identification objects for a next training according to the difficulty vector.

The computer-readable storage medium 30 may be provided in the processor 32 or a data source reader. At this point, the processor 32 or the data source reader may communicate with a cloud server to obtain the corresponding computer program 31.

It can be understood that the computer program 31 includes computer program codes. The computer program codes may be in form of source codes, object codes, an executable file, or some intermediate forms, etc. The computer-readable storage medium may include: any entity or device capable of carrying computer program codes, a recording medium, a U disk, a mobile hard disk, a magnetic disk, an optical disk, a computer memory, a read-only memory (ROM), a random access memory (RAM), and a software distribution media, etc.

The model training method and apparatus, the electronic device, and the readable storage medium of the present application normalize the current weight matrix in the pedestrian re-identification training network, and calculate the difficulty vector of the training samples to increase a probability of loading difficult samples in the sample loading process, thereby improving the algorithm's ability to distinguish difficult samples and improving the accuracy of the algorithm.

Figure 7:
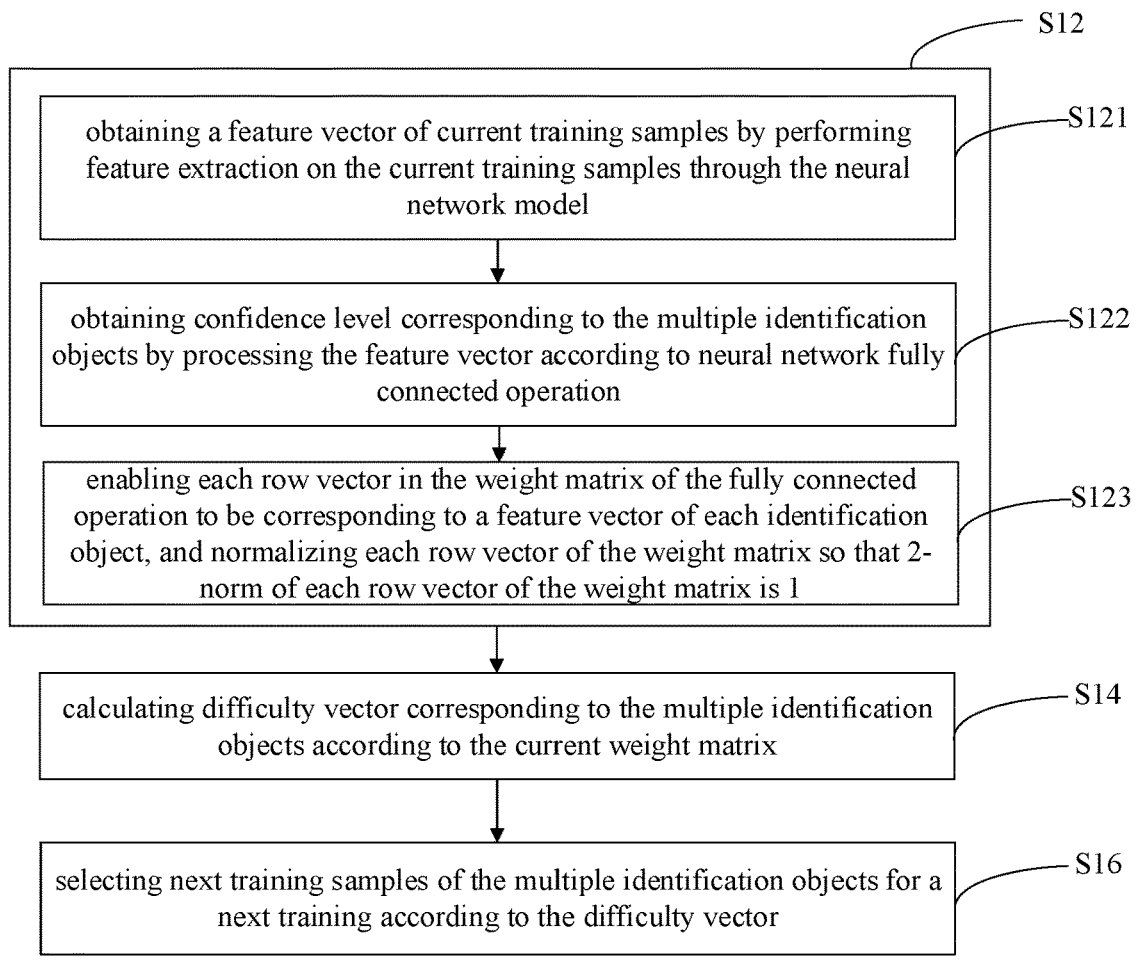
FIG. 7 is a schematic flowchart of a model training method according to some embodiments of the present application.

Referring to FIG. 7, in some embodiments, the step S12 includes:

S121: obtaining a feature vector of current training samples by performing feature extraction on the current training samples through the neural network model;

S122: obtaining confidence level corresponding to the multiple identification objects by processing the feature vector according to neural network fully connected operation;

S123: enabling each row vector in the weight matrix of the fully connected operation to be corresponding to a feature vector of each identification object, and normalizing each row vector of the weight matrix so that 2-norm of each row vector of the weight matrix is 1.

Figure 8:
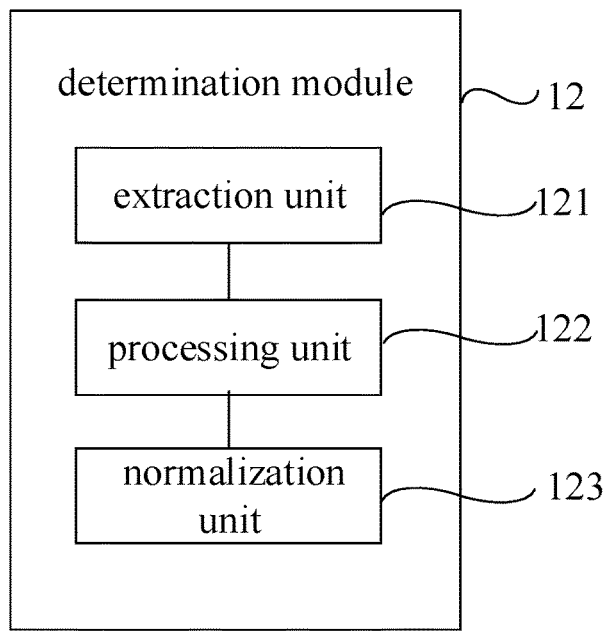
FIG. 8 is a schematic diagram of a determination module in a model training apparatus according to some embodiments of the present application.

Referring to FIG. 8, the determination module 12 includes an extraction unit 121, a processing unit 122, and a normalization unit 123.

The step S121 may be implemented by the extraction unit 121. The step S122 may be implemented by the processing unit 122. The step S123 may be implemented by the normalization unit 123. In other words, the extraction unit 121 is configured to obtain feature vector of current training samples by performing feature extraction on the current training samples through the neural network model. The processing unit 122 is configured to obtain confidence level corresponding to the multiple identification objects by processing the feature vector according to neural network fully connected operation. The normalization unit 123 is configured to, enable each row vector in the weight matrix of the fully connected operation to be corresponding to a feature vector of each identification object, and normalize each row vector of the weight matrix so that 2-norm of each row vector of the weight matrix is 1.

Referring to FIG. 5 or FIG. 6, the processor 21 or the processor 32 is configured to, obtain feature vector of current training samples by performing feature extraction on the current training samples through the neural network model; obtain confidence level corresponding to the multiple identification objects by processing the feature vector according to neural network fully connected operation; and enable each row vector in the weight matrix of the fully connected operation to be corresponding to a feature vector of each identification object, and normalize each row vector of the weight matrix so that 2-norm of each row vector of the weight matrix is 1.

Specifically, the feature vector of the training samples are obtained by feature extraction. When the convolutional neural network processes images, an image is often expressed as a vector of pixels. For example, an image of 1000×1000 pixels, may be expressed as a vector of 1,000,000.

The fully connected operation refers to calculation of fully connected layer in the deep learning. The feature vector obtained via feature extraction, are processed by the fully connected layer calculation to obtain confidence level scores corresponding to different IDs. The higher the score, the greater the probability that the image corresponds to the ID. Fully connected layers (FC) serves as a "classifier" in the entire convolutional neural network.

The confidence level corresponding to the multiple identification objects may be obtained by processing the feature vector according to neural network fully connected operation. The confidence level refers to a corresponding probability that a certain allowable error range encompasses an estimated value and an overall parameter. The number of rows of a weight parameter matrix of the fully connected layer is a total number of IDs in training data, and the number of columns of the weight parameter matrix of the fully connected layer is the dimension of the feature vector. Then, the weight matrix is normalized so that 2-norm of a weight vector corresponding to each identification object is 1. 2-norm of a vector is to square each element in the vector first, then sum square values obtained by squaring each element in the vector, and finally square root of a sum obtained by summing the square values. Normalization refers to multiplying each row vector of the matrix by a constant so that 2-norm of the row vector is equal to 1. That is, after normalizing the row vector of the weight matrix, the current weight matrix W with 2-norm of the row vector being 1, can be obtained. For example, the current weight matrix W may be $$\begin{bmatrix} 1 & 0 \\ 0 & 1 \\ 0.2 & 0.98 \end{bmatrix}.$$

More specifically, in some embodiments, normalizing each row vector of the weight matrix so that 2-norm of each row vector of the weight matrix is 1, includes:

normalizing each row vector of the weight matrix according to the following conditional formula:

$$\begin{cases} S(i) = \sqrt{\sum_j W_0(i,j)^2} \\ W(i,j) = W_0(i,j)/S(i) \end{cases}$$

where $W_0(i,j)$ represents an element in an i-th row and a j-th column of the weight matrix before normalization; $S(i)$ represents mean square value of the weight matrix before normalization; $W(i,j)$ represents an element in an i-th row and a j-th column of the weight matrix after normalization.

Referring to FIG. 8, the normalization unit 123 is configured to normalize each row vector of the weight matrix according to the following conditional formula:

$$\begin{cases} S(i) = \sqrt{\sum_j W_0(i,j)^2} \\ W(i,j) = W_0(i,j)/S(i) \end{cases}$$

where $W_0(i,j)$ represents an element in an i-th row and a j-th column of the weight matrix before normalization; $S(i)$ represents mean square value of the weight matrix before normalization; $W(i,j)$ represents an element in an i-th row and a j-th column of the weight matrix after normalization.

Referring to FIG. 5 or FIG. 6, the processor 21 or the processor 32 is configured to normalize each row vector of the weight matrix according to the following conditional formula:

$$\begin{cases} S(i) = \sqrt{\sum_j W_0(i,j)^2} \\ W(i,j) = W_0(i,j)/S(i) \end{cases}$$

where $W_0(i,j)$ represents an element in an i-th row and a j-th column of the weight matrix before normalization; $S(i)$ represents mean square value of the weight matrix before normalization; $W(i,j)$ represents an element in an i-th row and a j-th column of the weight matrix after normalization.

Specifically, for example, a weight matrix W_0 before normalization is $$\begin{bmatrix} 2 & 0 \\ 0 & 2 \\ 0.4 & 1.96 \end{bmatrix},$$

then, $S(1)=\sqrt{\Sigma_j W_0(1,j)^2}=\sqrt{4}=2$, $W(1,1)=W_0(1,1)/S(1)=2/2=1$, $W(1,2)=W_0(1,2)/S(1)=0/2=0$;

$S(2)=\sqrt{\Sigma_j W_0(2,j)^2}=\sqrt{4}=2$, $W(2,1)=W_0(2,1)/S(2)=0/2=0$, $W(2,2)=W_0(2,2)/S(2)=2/2=0$;

$S(3)=\sqrt{\Sigma_j W_0(3,j)^2}=\sqrt{4}=2$, $W(3,1)=W_0(3,1)/S(3)=0.4/2=0.2$, $W(3,2)=W_0(3,2)/S(3)=1.96/2=0.98$;

That is, in summary, a weight matrix W after normalization is obtained as $$\begin{bmatrix} 1 & 0 \\ 0 & 1 \\ 0.2 & 0.98 \end{bmatrix}.$$

Figure 9:
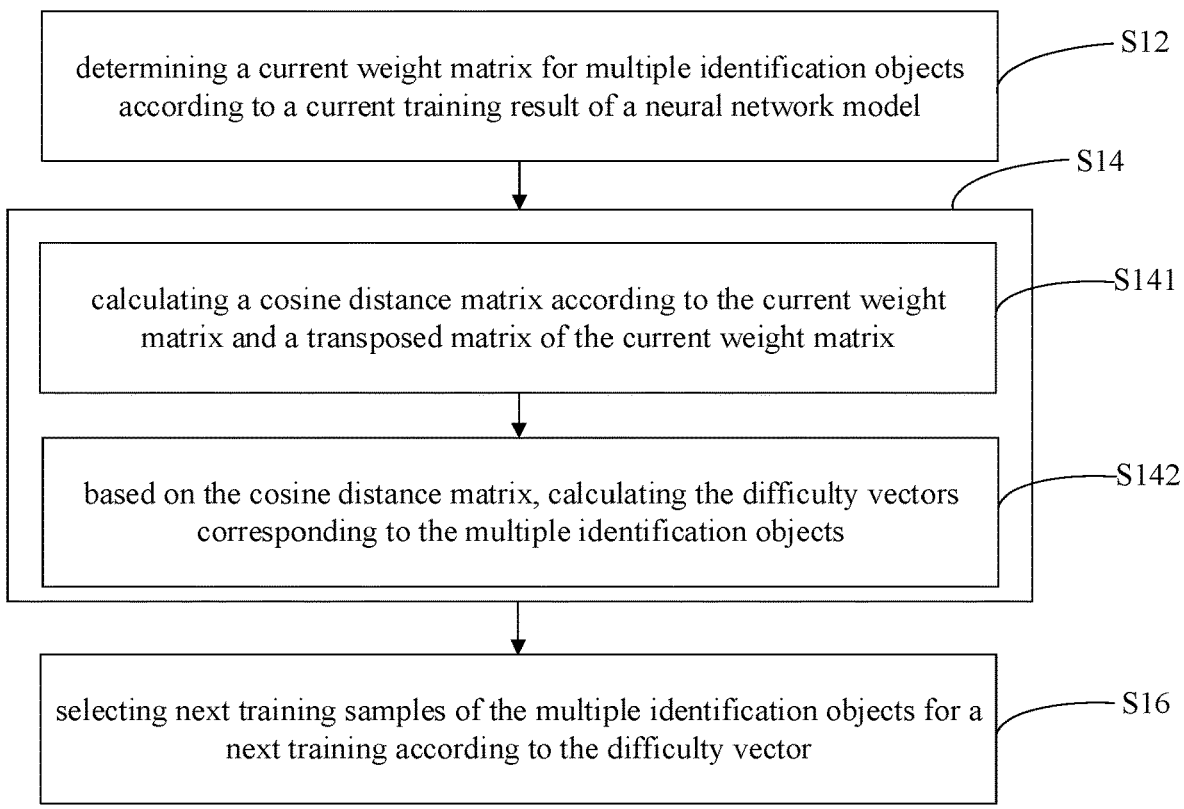
FIG. 9 is a schematic flowchart of a model training method according to some embodiments of the present application.

Referring to FIG. 9, in some embodiments, the step S14 includes:

S141: calculating a cosine distance matrix according to the current weight matrix and a transposed matrix of the current weight matrix; where the cosine distance matrix is calculated by the following conditional formula: $D=W*W^T$, where D is the cosine distance matrix, $W^T$ is the transposed matrix of the current weight matrix, and W is the current weight matrix.

Figure 10:
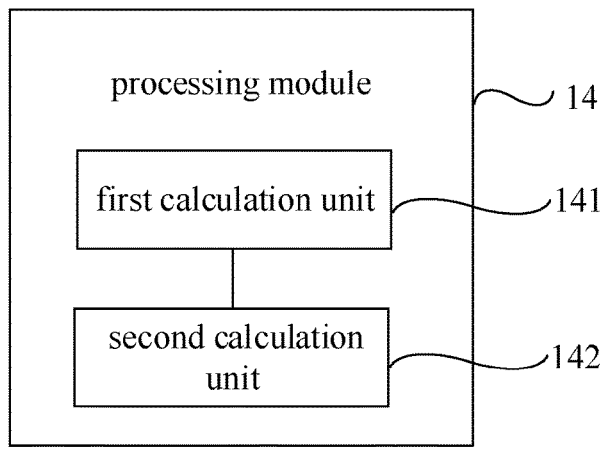
FIG. 10 is a schematic diagram of a calculation module in a model training apparatus according to some embodiments of the present application.

Referring to FIG. 10, the processing module 14 includes a first calculation unit 141.

The step S141 may be implemented by the first calculation unit 141. In other words, the first calculation unit 141 is configured to calculate a cosine distance matrix according to the current weight matrix and a transposed matrix of the current weight matrix; where the cosine distance matrix is calculated by the following conditional formula: $D=W*W^T$, where D is the cosine distance matrix, $W^T$ is the transposed matrix of the current weight matrix, and W is the current weight matrix.

Referring to FIG. 5 or FIG. 6, the processor 21 or the processor 32 is configured to calculate a cosine distance matrix according to the current weight matrix and a transposed matrix of the current weight matrix; where the cosine distance matrix is calculated by the following conditional formula: $D=W*W^T$, where D is the cosine distance matrix, $W^T$ is the transposed matrix of the current weight matrix, and W is the current weight matrix.

Specifically, for example, the current weight matrix W is a 2*3 matrix, i.e., $$\begin{bmatrix} 1 & 0 \\ 0 & 1 \\ 0.2 & 0.98 \end{bmatrix},$$

and the transposed matrix $W^T$ is $$\begin{bmatrix} 1 & 0 & 0.2 \\ 0 & 1 & 0.98 \end{bmatrix},$$

then, the cosine distance matrix D is calculated according to the above formula as $$D = W*W^T = \begin{bmatrix} 1 & 0 \\ 0 & 1 \\ 0.2 & 0.98 \end{bmatrix} * \begin{bmatrix} 1 & 0 & 0.2 \\ 0 & 1 & 0.98 \end{bmatrix} = \begin{bmatrix} 1 & 0 & 0.2 \\ 0 & 1 & 0.98 \\ 0.2 & 0.98 & 1 \end{bmatrix}.$$

Referring to FIG. 9, in some embodiments, the step S14 includes:

S142: based on the cosine distance matrix, calculating the difficulty vector corresponding to the multiple identification objects according to the following conditional formula:

$C_i = \max_{n \neq i} D(i,n)$; and $C = \{C_1, C_2, C_3, \ldots, C_N\}$ where, "i" indicates that a row number in the cosine distance matrix D is an i-th row or an i-th column, n indicates that a column number in the cosine distance matrix D is an n-th row or an n-th column; C represents a difficulty vector corresponding to the multiple identification objects; $C_i$ represents a difficulty of distinguishing the identification objects, N represents the number of identification objects.

Referring to FIG. 10, the processing module 14 further includes a second calculation unit 142.

The step S142 may be implemented by the second calculation unit 142. In other words, the second calculation unit 142 is configured to, based on the cosine distance matrix, calculate the difficulty vector corresponding to the multiple identification objects according to the following conditional formula:

$C_i = \max_{n \neq i} D(i,n)$; and $C = \{C_1, C_2, C_3, \ldots, C_N\}$ where, "i" indicates that a row number in the cosine distance matrix D is an i-th row or an i-th column, n indicates that a column number in the cosine distance matrix D is an n-th row or an n-th column; C represents a difficulty vector corresponding to the multiple identification objects; C_i represents a difficulty of distinguishing the identification objects, N represents the number of identification objects.

Referring to FIG. 5 or FIG. 6, the processor 21 or the processor 32 is configured to, based on the cosine distance matrix, calculate the difficulty vector corresponding to the multiple identification objects according to the following conditional formula:

$$C_i = \max_{n \neq i} D(i, n); \text{ and}$$

$$C = \{C_1, C_2, C_3, \ldots, C_N\}$$

where, "i" indicates that a row number in the cosine distance matrix D is an i-th row or an i-th column, n indicates that a column number in the cosine distance matrix D is an n-th row or an n-th column; C represents a difficulty vector corresponding to the multiple identification objects; C_i represents a difficulty of distinguishing the identification objects, N represents the number of identification objects.

Specifically, it is assumed that the cosine distance matrix D is $$\begin{bmatrix} 1 & 0 & 0.2 \\ 0 & 1 & 0.98 \\ 0.2 & 0.98 & 1 \end{bmatrix},$$

according to $$C_i = \max_{n \neq i} D(i, n),$$

when "i" represent an i-th row, "n" represents an n-th column, and therefore, when "i" represents the first row, "n" cannot be equal to "i", that is, $$C_1 = \max_{n \neq 1} D(1, n) = \max_{n \neq 1} D(0, 0.2) = 0.2,$$

$$C_2 = \max_{n \neq 2} D(2, n) = \max_{n \neq 1} D(0, 0.98) = 0.98,$$

$$C_3 = \max_{n \neq 3} D(3, n) = \max_{n \neq 3} D(0.2, 0.98) = 0.98,$$

thereby getting: C1=0.2, C2=0.98, C3=0.98, that is, the difficulty vector C={0.2, 0.98, 0.98}. C1=0.2 represents an identification difficulty of distinguishing a first identification object. C2=0.98 represents an identification difficulty of distinguishing a second identification object. C3=0.98 represents an identification difficulty of distinguishing a third identification object. Therefore, it can be concluded that the identification difficulty of the second identification object and the identification difficulty of the third identification object are higher than the identification difficulty of the first identification object, and the second identification object and the third identification object are more likely to occur identification error.

Figure 11:
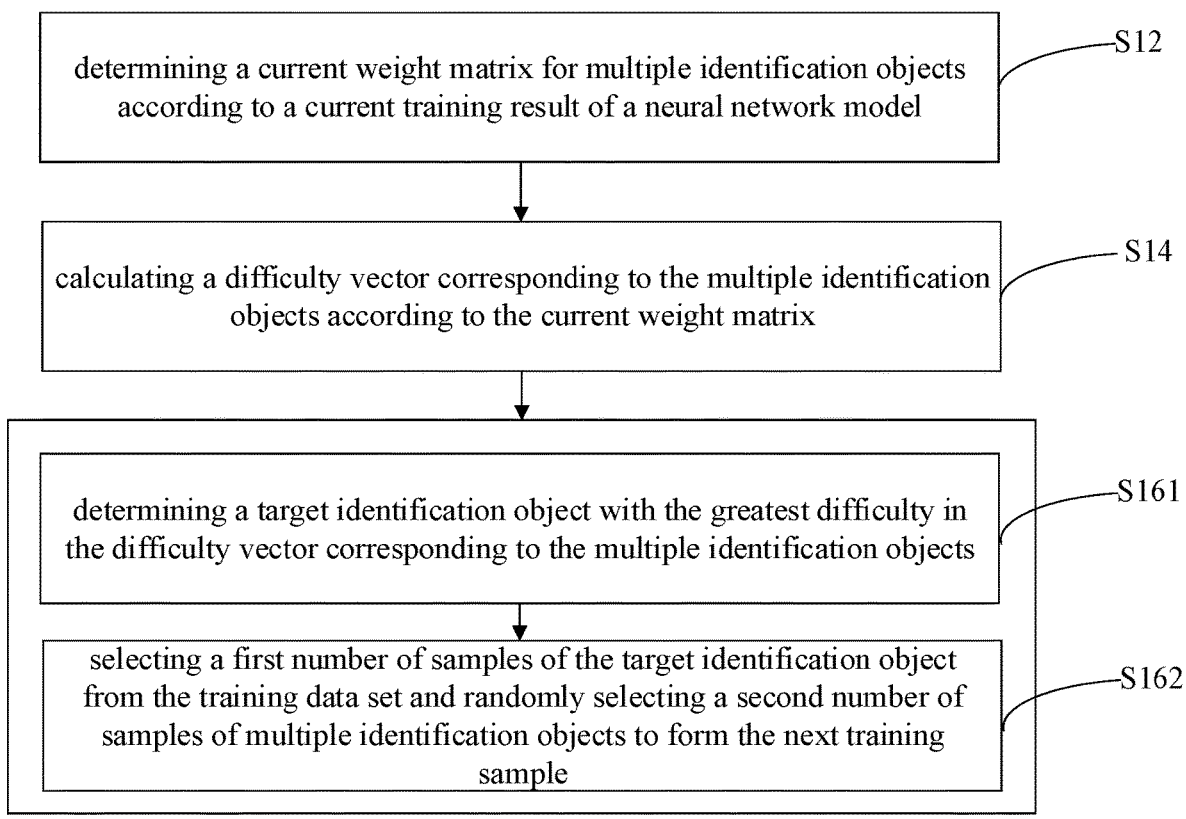
FIG. 11 is a schematic flowchart of a model training method according to some embodiments of the present application.

Referring to FIG. 11, in some embodiments, the step S16 includes:

S161: determining a target identification object with the greatest difficulty in the difficulty vector corresponding to the multiple identification objects;

S162: selecting a first number of samples of the target identification object from the training data set and randomly selecting a second number of samples of multiple identification objects to form the next training sample.

Figure 12:
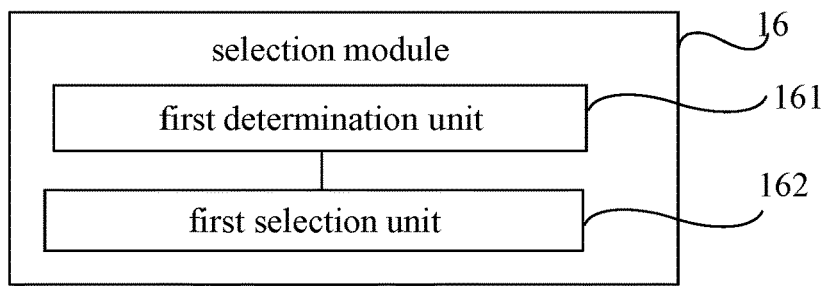
FIG. 12 is a schematic diagram of a selection module in a model training apparatus according to some embodiments of the present application.

Referring to FIG. 12, the selection module 16 includes: a first determination unit 161 and a first selection unit 162.

The step S161 may be implemented by the first determination unit 161, and the step S162 may be implemented by the first selection unit 162. In other words, the first determination unit 161 is configured to determine a target identification object with the greatest difficulty in the difficulty vector corresponding to the multiple identification objects. The first selection unit 162 is configured to select a first number of samples of the target identification object from the training data set and randomly select a second number of samples of multiple identification objects to form the next training sample.

Referring to FIG. 5 or FIG. 6, the processor 21 or the processor 32 is configured to, determine a target identification object with the greatest difficulty in the difficulty vector corresponding to the multiple identification objects; select a first number of samples of the target identification object from the training data set and randomly select a second number of samples of multiple identification objects to form the next training sample.

Specifically, for example, in a case that there are three identification objects including ID1, ID2, and ID3, and difficulty vector C={0.2, 0.98, 0.92} are corresponding to the three identification objects, the first determination unit 161 can determine that the second identification object ID2 has the greatest difficulty, and then the second identification object ID2 is determined as a target identification object. The first selection unit 162 selects a first number of samples from training samples of the second identification object. Assuming a total number of samples corresponding to the second identification object (ID2) is 100 pictures, then the first number of samples may include selecting 10, 15, 20, 25, 30, 40, 50, 60, 70, 80 pictures from 100 pictures. Meanwhile, the first selection unit 162 may further select a second number of samples from samples such as 300 pictures of the remaining identification objects (ID1 and ID3). The second number may be 10, 15, 20, 25, 35, 40, 55, 60, 75, 80, etc. Finally, the number of training samples formed each time is a sum of the first number of samples and the second number of samples. For example, when the first number of samples include 10 pictures, and the second number of samples includes 10 pictures, then a total number of formed training samples is 20 pictures.

Figure 13:
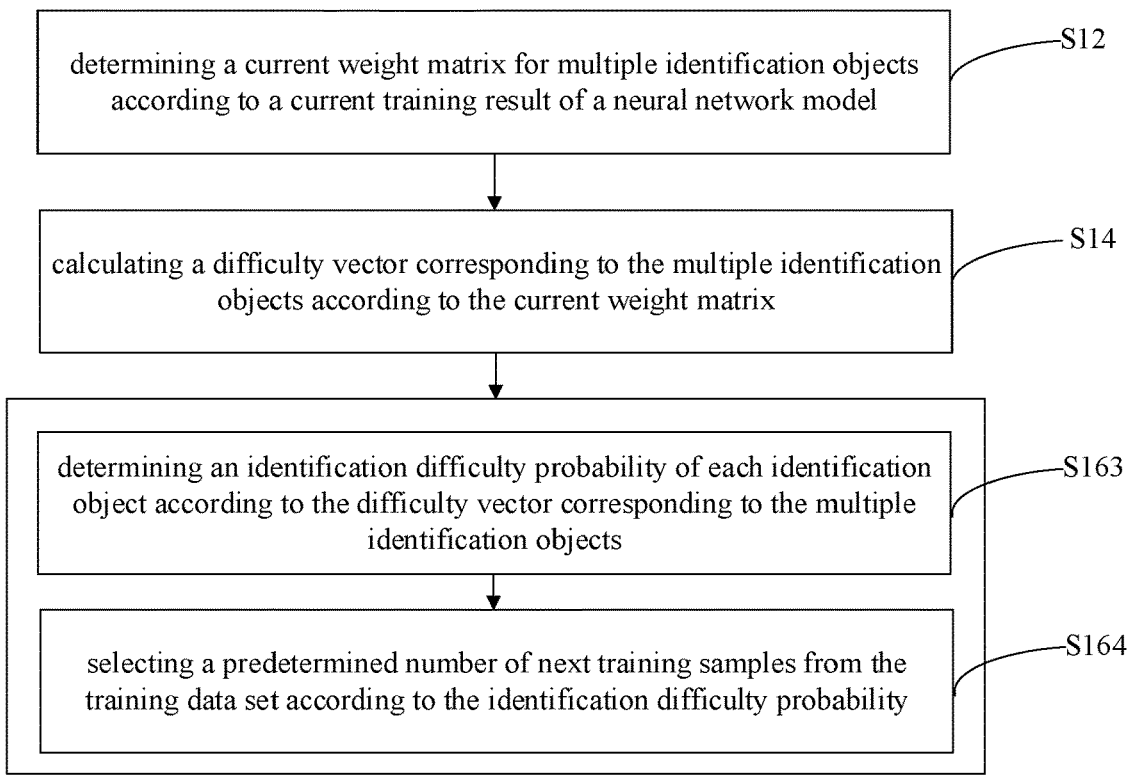
FIG. 13 is a schematic flowchart of a model training method according to some embodiments of the present application.

Referring to FIG. 13, in some embodiments, the step S16 further includes:

S163: determining an identification difficulty probability of each identification object according to the difficulty vector corresponding to the multiple identification objects; and S164: selecting a predetermined number of next training samples from the training data set according to the identification difficulty probability.

Figure 14:
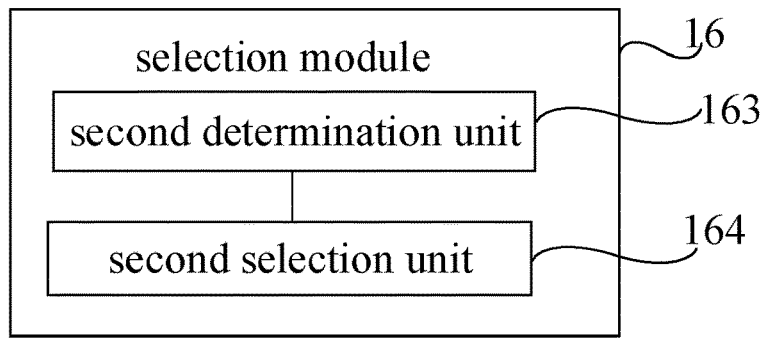
FIG. 14 is a schematic diagram of a selection module in a model training apparatus according to some embodiments of the present application.

Referring to FIG. 14, the selection module 16 includes a second determination unit 163 and a second selection unit 164.

The step S163 may be implemented by the second determination unit 163, and the step S164 may be implemented by the second selection unit 164. In other words, the second determination unit 163 is configured to determine an identification difficulty probability of each identification object according to the difficulty vector corresponding to the multiple identification objects. The second selection unit 164 is configured to select a predetermined number of next training samples from the training data set according to the identification difficulty probability.

Referring to FIG. 5 or FIG. 6, the processor 21 or the processor 32 is configured to, determine an identification difficulty probability of each identification object according to the difficulty vector corresponding to the multiple identification objects; and select a predetermined number of next training samples from the training data set according to the identification difficulty probability.

Specifically, for example, the number of identification objects may be two or more. Taking five identification objects as an example, the five identification objects are ID1, ID2, ID3, ID4, and ID5, respectively. Assuming that difficulty vector D={0.98, 0.96, 0.9, 0.5, 0.46} are corresponding to the five identification objects, and a total difficulty P=0.98+0.96+0.9+0.5+0.4=3.8, then according to the difficulty vector corresponding to the multiple identification objects, an identification difficulty probability of each identification object may be determined as P={P1, P2, P3, P4, P5}. P1=0.98/3.8=0.258, P2=0.96/3.8=0.253, P3=0.9/3.8=0.236, P4=0.5/3.8=0.132, P5=0.46/3.8=0.121. That is, P={0.258, 0.253, 0.236, 0.132, 0.121}. Values of the identification difficulty probabilities are sorted from large to small as P1>P2>P3>P4>P5, that is, the probability of selecting a predetermined number of training samples in the first identification object ID1 is the largest; the probability of selecting a predetermined number of training samples in the second identification object ID2 is the second largest; in turns, the least probability of selecting samples is the fifth identification object ID5.

The predetermined number of training samples may include 100 pictures, which means that 100 pictures can be selected as training samples from 10000 picture (total number of samples). The predetermined number may be a preset number of training samples, or other values, which will not be repeated here.

The model training method and apparatus, the electronic device and the readable storage medium of the present application normalize the weight matrix in the pedestrian re-identification training network, calculate the difficulty vector of the training samples, select samples with greater difficulty according to the difficulty vector and train the algorithm with the training samples composed of the samples with greater difficulty and random other samples, or select a predetermined number of training samples for algorithm training according to a sample loading probability. In this way, it is convenient to guide the model to identify and distinguish difficult samples, thereby improving the algorithm's ability to distinguish difficult samples, i.e., improving the ability of identifying pedestrian IDs through pictures, and then improving the accuracy of the algorithm.

The above are merely the embodiments of the present disclosure and shall not be used to limit the scope of the present disclosure. It should be noted that, a pedestrian skilled in the art may make improvements and modifications without departing from the principle of the present disclosure, and these improvements and modifications shall also fall within the scope of the present disclosure. The protection scope of the present disclosure shall be subject to the protection scope of the claims.

What is claimed is:

1. A model training method of a pedestrian re-identification network, comprising:
   determining a current weight matrix for multiple identification objects according to a current training result of a neural network model;
   calculating a difficulty vector corresponding to the multiple identification objects according to the current weight matrix; and
   selecting next training samples of the multiple identification objects for a next training according to the difficulty vector;
   wherein the calculating the difficulty vector corresponding to the multiple identification objects according to the current weight matrix, includes:
   calculating a cosine distance matrix according to the current weight matrix and a transposed matrix of the current weight matrix; wherein the cosine distance matrix is calculated by the following conditional formula:

$D = W * W^T,$ wherein D is the cosine distance matrix, $W^T$ is the transposed matrix of the current weight matrix, and W is the current weight matrix.

2. The method according to claim 1, wherein the calculating the difficulty vector corresponding to the multiple identification objects according to the current weight matrix, includes:
   based on the cosine distance matrix, calculating the difficulty vector corresponding to the multiple identification objects according to the following conditional formula:

$$C_i = \max_{n \neq i} D(i, n); \text{ and}$$

$$C = \{C_1, C_2, C_3, \ldots, C_N\}$$

wherein, "i" indicates that a row number in the cosine distance matrix D is an i-th row, "n" indicates that a column number in the cosine distance matrix D is an n-th row or an n-th column; "C" represents the difficulty vector corresponding to the multiple identification objects; C_i represents a difficulty of distinguishing the identification objects, N represents the number of identification objects.

3. The method according to claim 2, wherein the selecting next training samples of the multiple identification objects for a next training according to the difficulty vector, includes:
   determining a target identification object with a greatest difficulty in the difficulty vector corresponding to the multiple identification objects; and
   selecting a first number of samples of the target identification object from a training data set and randomly selecting a second number of samples of multiple identification objects to form the next training sample.

4. The method according to claim 2, wherein the selecting next training samples of the multiple identification objects for a next training according to the difficulty vector, includes:
   determining an identification difficulty probability of each identification object according to the difficulty vector corresponding to the multiple identification objects; and
   selecting a predetermined number of next training samples from a training data set according to the identification difficulty probability.

5. The method according to claim 1, wherein the determining the current weight matrix for multiple identification objects according to the current training result of the neural network model, includes:

obtaining a feature vector of current training samples by performing feature extraction on the current training samples through the neural network model;

obtaining confidence level corresponding to the multiple identification objects by processing the feature vector according to neural network fully connected operation;

enabling each row vector in a weight matrix of the fully connected operation to be corresponding to a feature vector of each identification object, and normalizing each row vector of the weight matrix so that 2-norm of each row vector of the weight matrix is 1.

6. The method according to claim 5, wherein the normalizing each row vector of the weight matrix so that 2-norm of each row vector of the weight matrix is 1, includes:

normalizing each row vector of the weight matrix according to the following conditional formula:

$$\begin{cases} S(i) = \sqrt{\sum_j W_0(i,j)^2} \\ W(i,j) = W_0(i,j)/S(i) \end{cases}$$

wherein $W_0(i,j)$ represents an element in an i-th row and a j-th column of the weight matrix before normalization; $S(i)$ represents mean square value of the weight matrix before normalization; $W(i,j)$ represents an element in an i-th row and a j-th column of the weight matrix after normalization.

7. An electronic device, comprising: a processor and a memory; wherein the memory stores a computer program, and the computer program is executed by the processor to implement:

determining a current weight matrix for multiple identification objects according to a current training result of a neural network model;

calculating a difficulty vector corresponding to the multiple identification objects according to the current weight matrix; and selecting next training samples of the multiple identification objects for a next training according to the difficulty vector;

wherein the computer program is executed by the processor to implement:

calculating a cosine distance matrix according to the current weight matrix and a transposed matrix of the current weight matrix; wherein the cosine distance matrix is calculated by the following conditional formula:

$$D = W * W^T,$$

wherein D is the cosine distance matrix, $W^T$ is the transposed matrix of the current weight matrix, and W is the current weight matrix.

8. The electronic device according to claim 7, wherein the computer program is executed by the processor to implement:

based on the cosine distance matrix, calculating the difficulty vector corresponding to the multiple identification objects according to the following conditional formula:

$$C_i = \max_{n \neq i} D(i,n); \text{ and}$$

$$C = \{C_1, C_2, C_3, \ldots, C_N\}$$

wherein, "i" indicates that a row number in the cosine distance matrix D is an i-th row, "n" indicates that a column number in the cosine distance matrix D is an n-th row or an n-th column; "C" represents the difficulty vector corresponding to the multiple identification objects; $C\_i$ represents a difficulty of distinguishing the identification objects, N represents the number of identification objects.

9. The electronic device according to claim 8, wherein the computer program is executed by the processor to implement:

determining a target identification object with a greatest difficulty in the difficulty vector corresponding to the multiple identification objects; and selecting a first number of samples of the target identification object from a training data set and randomly selecting a second number of samples of multiple identification objects to form the next training sample.

10. The electronic device according to claim 8, wherein the computer program is executed by the processor to implement:

determining an identification difficulty probability of each identification object according to the difficulty vector corresponding to the multiple identification objects; and selecting a predetermined number of next training samples from a training data set according to the identification difficulty probability.

11. The electronic device according to claim 7, wherein the computer program is executed by the processor to implement:

obtaining a feature vector of current training samples by performing feature extraction on the current training samples through the neural network model;

obtaining confidence level corresponding to the multiple identification objects by processing the feature vector according to neural network fully connected operation;

enabling each row vector in a weight matrix of the fully connected operation to be corresponding to a feature vector of each identification object, and normalizing each row vector of the weight matrix so that 2-norm of each row vector of the weight matrix is 1.

12. The electronic device according to claim 11, wherein the computer program is executed by the processor to implement:

normalizing each row vector of the weight matrix according to the following conditional formula:

$$\begin{cases} S(i) = \sqrt{\sum_j W_0(i,j)^2} \\ W(i,j) = W_0(i,j)/S(i) \end{cases}$$

wherein $W_0(i,j)$ represents an element in an i-th row and a j-th column of the weight matrix before normalization; $S(i)$ represents mean square value of the weight matrix before normalization; $W(i,j)$ represents an element in an i-th row and a j-th column of the weight matrix after normalization.

13. A non-volatile computer-readable storage medium comprising a computer program stored thereon; wherein the computer program is executed by one or more processors to implement:

determining a current weight matrix for multiple identification objects according to a current training result of a neural network model;

calculating a difficulty vector corresponding to the multiple identification objects according to the current weight matrix; and selecting next training samples of the multiple identification objects for a next training according to the difficulty vector wherein the computer program is executed by one or more processors to implement:

calculating a cosine distance matrix according to the current weight matrix and a transposed matrix of the current weight matrix; wherein the cosine distance matrix is calculated by the following conditional formula:

$$D = W * W^T,$$

wherein D is the cosine distance matrix, $W^T$ is the transposed matrix of the current weight matrix, and W is the current weight matrix.

14. The non-volatile computer-readable storage medium according to claim 13, wherein the computer program is executed by one or more processors to implement:

based on the cosine distance matrix, calculating the difficulty vector corresponding to the multiple identification objects according to the following conditional formula:

$$C_i = \max_{n \neq i} D(i, n); \text{ and}$$

$$C = \{C_1, C_2, C_3, \ldots, C_N\}$$

wherein, "i" indicates that a row number in the cosine distance matrix D is an i-th row, "n" indicates that a column number in the cosine distance matrix D is an n-th row or an n-th column; "C" represents the difficulty vector corresponding to the multiple identification objects; C_i represents a difficulty of distinguishing the identification objects, N represents the number of identification objects.

15. The non-volatile computer-readable storage medium according to claim 14, wherein the computer program is executed by one or more processors to implement:

determining a target identification object with a greatest difficulty in the difficulty vector corresponding to the multiple identification objects; and selecting a first number of samples of the target identification object from a training data set and randomly selecting a second number of samples of multiple identification objects to form the next training sample.

16. The non-volatile computer-readable storage medium according to claim 14, wherein the computer program is executed by one or more processors to implement:

determining an identification difficulty probability of each identification object according to the difficulty vector corresponding to the multiple identification objects; and selecting a predetermined number of next training samples from a training data set according to the identification difficulty probability.

17. The non-volatile computer-readable storage medium according to claim 13, wherein the computer program is executed by one or more processors to implement:

obtaining a feature vector of current training samples by performing feature extraction on the current training samples through the neural network model;

obtaining confidence level corresponding to the multiple identification objects by processing the feature vector according to neural network fully connected operation;

enabling each row vector in a weight matrix of the fully connected operation to be corresponding to a feature vector of each identification object, and normalizing each row vector of the weight matrix so that 2-norm of each row vector of the weight matrix is 1.

* * * * *